(12) United States Patent
Honma

(10) Patent No.: US 10,871,231 B2
(45) Date of Patent: Dec. 22, 2020

(54) SEALING DEVICE

(71) Applicant: NOK CORPORATION, Tokyo (JP)

(72) Inventor: Naoyuki Honma, Fukushima (JP)

(73) Assignee: NOK CORPORATION, Tokyo (JP)

( * ) Notice: Subject to any disclaimer, the term of this patent is extended or adjusted under 35 U.S.C. 154(b) by 86 days.

(21) Appl. No.: 15/691,983

(22) Filed: Aug. 31, 2017

(65) Prior Publication Data

US 2018/0119820 A1 May 3, 2018

(30) Foreign Application Priority Data

Sep. 1, 2016 (JP) .................................. 2016-170531

(51) Int. Cl.
*F16J 15/3244* (2016.01)
*F16J 15/3204* (2016.01)
*F16J 15/3276* (2016.01)

(52) U.S. Cl.
CPC ....... *F16J 15/3244* (2013.01); *F16J 15/3204* (2013.01); *F16J 15/3276* (2013.01)

(58) Field of Classification Search
CPC ... F16J 15/3244; F16J 15/3204; F16J 15/3276
USPC .................................................. 277/559, 560
See application file for complete search history.

(56) References Cited

U.S. PATENT DOCUMENTS

| | | | | |
|---|---|---|---|---|
| 4,174,845 A * | 11/1979 | Hadaway | ............. | F16J 15/3244 277/559 |
| 5,915,696 A * | 6/1999 | Onuma | .................. | F16J 15/328 277/559 |
| 6,276,691 B1 * | 8/2001 | Nishigaki | ............ | F16J 15/3244 264/161 |
| 6,726,211 B1 * | 4/2004 | Kuroki | ................. | F16J 15/3244 277/353 |
| 6,729,624 B1 * | 5/2004 | Johnston | .............. | F16J 15/3244 277/351 |
| 6,921,080 B2 * | 7/2005 | Johnen | ................. | F16J 15/3244 277/549 |
| 7,506,875 B2 * | 3/2009 | Matsui | ................. | F16J 15/3244 277/553 |

(Continued)

FOREIGN PATENT DOCUMENTS

| | | |
|---|---|---|
| JP | H01-312274 A | 12/1989 |
| JP | H09-42463 A | 2/1997 |

(Continued)

*Primary Examiner* — Eugene G Byrd
(74) *Attorney, Agent, or Firm* — Daniel J. Sepanik, Esq.; Harness, Dickey & Pierce, P.L.C.

(57) ABSTRACT

A sealing device 1 is provided with, on an atmospheric side A inclined surface 24 of a seal lip, a forward direction screw 26 which extends in a direction of forming an angle of attack with respect to a direction Z of forward rotation of a rotation shaft 2 and exerts pumping action with respect to sealing target fluid during the forward rotation of the rotation shaft 2, and a reverse direction screw 27 which extends in a direction of forming an angle of attack with respect to a direction of reverse rotation of the rotation shaft 2 and exerts pumping action with respect to the sealing target fluid during the reverse rotation of the rotation shaft 2, in which a droplet prevention screw 29 for the sealing target fluid is provided on the reverse direction screw 27 side of the inclined surface 24 so as to be positioned in a region for forming the angle of attack.

6 Claims, 4 Drawing Sheets

(56) References Cited

U.S. PATENT DOCUMENTS

| | | | | |
|---|---|---|---|---|
| 2002/0043770 A1* | 4/2002 | Ohta | ................ | F16J 15/3244 |
| | | | | 277/559 |
| 2002/0163138 A1* | 11/2002 | Dietle | ................ | F16J 15/162 |
| | | | | 277/559 |
| 2005/0242521 A1* | 11/2005 | Bock | ................ | F16J 15/3244 |
| | | | | 277/559 |
| 2007/0152405 A1* | 7/2007 | Wen | ................ | F16J 15/3244 |
| | | | | 277/559 |
| 2010/0109252 A1* | 5/2010 | Matsui | ................ | F16J 15/324 |
| | | | | 277/559 |
| 2011/0204579 A1* | 8/2011 | Donovan | ............ | F16J 15/3244 |
| | | | | 277/559 |
| 2014/0312571 A1* | 10/2014 | Kurth | ................ | F16J 15/3244 |
| | | | | 277/559 |
| 2015/0097344 A1* | 4/2015 | Hamamoto | .......... | F16J 15/3244 |
| | | | | 277/550 |
| 2015/0115543 A1* | 4/2015 | Nakagawa | .......... | F16J 15/3244 |
| | | | | 277/559 |
| 2016/0252181 A1* | 9/2016 | Hyakutake | .......... | F16J 15/3244 |
| | | | | 277/559 |

FOREIGN PATENT DOCUMENTS

| | | | | |
|---|---|---|---|---|
| JP | 2006292160 A | * | 10/2006 | |
| JP | 2009185968 A | * | 8/2009 | ........... F16J 15/3244 |
| JP | 2015-86908 A | | 5/2015 | |

\* cited by examiner

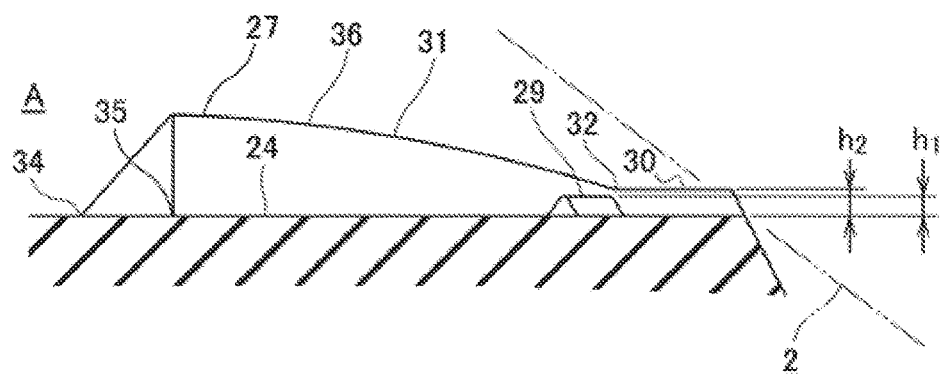
FIG 5
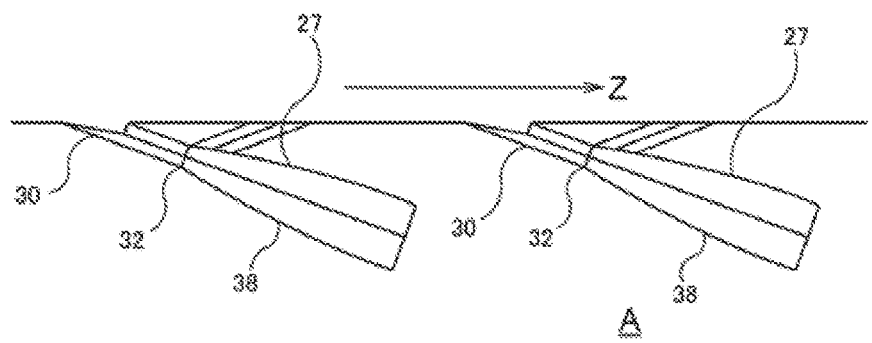
FIG 6
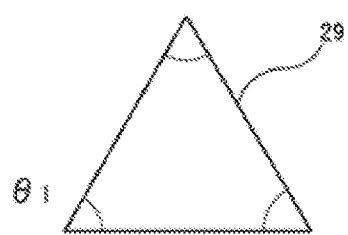 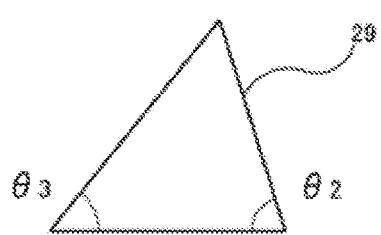
FIG 7a  FIG 7b

SEALING DEVICE

CROSS-REFERENCE TO RELATED APPLICATIONS

This application claims the benefit and priority of Japanese Application No. 2016-170531, filed Sep. 1, 2016. The entire disclosure of the above application is incorporated herein by reference.

FIELD

The present disclosure relates to a sealing device used for a sealing portion around a shaft of an apparatus having a rotary shaft.

BACKGROUND

Generally, in an apparatus having a rotary shaft such as a differential gear or the like in an automobile, a sealing device (oil seal) for sealing annular gaps is provided between a housing and a rotary shaft inserted in the housing, assembled mutually concentric and relatively rotatable.

Conventionally, providing a ridge, called a screw, on an atmospheric side inclined surface of a seal lip is known as a sealing device of this type. The ridge exerts pumping action during the rotation of the rotary shaft, and pushes back and seals sealing target fluid such as oil or grease leaked from a sealed space. Furthermore, this ridge, for example, is formed to provide both a forward direction screw which extends in a direction of forming an angle of attack with respect to a direction of forward rotation of a rotary shaft, and a reverse direction screw which extends in a direction of forming an angle of attack with respect to a direction of reverse rotation of the rotary shaft when configured as a sealing device usable on both sides of a differential gear (patent literature 1).

In addition, the ridge may be formed so that a so-called parallel screw and a ship's bottom-shaped screw are provided continuously to sustain the pumping action of the ridge (patent literature 2). Moreover, a sealing device having a ridge wherein both a forward direction screw and a reverse direction screw are provided, and a so-called parallel screw and a ship's bottom-shaped screw are provided continuously is also proposed. In this sealing device, it is possible to increase sealing performance, and in addition, to suppress the occurrence of droplet leakage, by further setting the inclination angle of the slope of the forward direction screw and the reverse direction screw within a predetermined range (patent literature 3).

PRIOR ART DOCUMENTS

Patent Literature

[Patent literature 1] Japanese Patent Application Publication No. H1-312274
[Patent literature 2] Japanese Patent Application Publication No. H9-42463
[Patent literature 3] Unexamined Japanese Patent Application 2015-86908

SUMMARY

Problem to be Solved by the Disclosure

The foregoing conventional sealing device prevents leakage of sealing target fluid due to the pumping action of the ridge, and also suppresses the occurrence of droplet leakage due to the shape of the inclined surface of the ridge. The present disclosure further aims to provide a sealing device which has higher sealing performance by suppressing occurrence of droplet leakage.

Means for Solving the Problem

The sealing device of the present disclosure is provided with, on an atmospheric side inclined surface of a seal lip, a forward direction screw which extends in a direction of forming an angle of attack with respect to a direction of forward rotation of a rotary shaft and exerts pumping action with respect to sealing target fluid during the forward rotation of the rotary shaft, and a reverse direction screw which extends in a direction of forming an angle of attack with respect to a direction of reverse rotation of the rotary shaft and exerts pumping action with respect to the sealing target fluid during the reverse rotation of the rotary shaft, in which a droplet prevention screw for the sealing target fluid is provided on the reverse direction screw side of the inclined surface so as to be positioned in a region for forming the angle of attack.

According to this disclosure, a droplet prevention screw is provided on the reverse direction screw side of the atmospheric side inclined surface of a seal lip to be positioned in a region for forming the angle of attack on the direction of forward rotation of a rotary shaft, therefore, it is possible to obstruct such leakage by the droplet prevention screw damming the sealing target fluid when sealing target fluid forms droplets on the atmospheric side and is about to leak out.

It is preferable that the droplet prevention screw also be provided on the forward direction screw side. According to this configuration, there are advantages such as being able to also be used as a sealing device provided on both sides of a differential gear.

It is preferable that the droplet prevention screw be provided to extend in a direction of forming an angle of attack with respect to a direction of rotation of the rotary shaft. According to this configuration, the droplet prevention screw can push back fluid that is about to leak on the atmospheric side and to effectively prevent leakage of sealing target fluid by extending to form an angle of attack with respect to a direction of rotation of a rotary shaft.

It is preferable that the forward direction screw and the reverse direction screw respectively include a parallel screw which extends in a direction of being separated from a tip end ridge portion as an origin of the tip end ridge portion of the seal lip, and a ship's bottom-shaped screw or a taper screw which extends in a direction of being further separated therefrom through a coupled portion of a tip end of the parallel screw in an extending direction. According to this configuration, the forward direction screw and the reverse direction screw are provided with a parallel screw and a ship's bottom-shaped screw or a taper screw, therefore, during initial use, sealability is ensured with a parallel screw with strong pumping action but as the parallel screw wears out to some extent due to use of the device, sealability can be ensured with the ship's bottom-shaped screw or taper screw, and it is possible to ensure sealability over a long period of time.

It is preferable that the droplet prevention screw be provided throughout an area between the coupled portion and the tip end ridge portion. According to this configuration, since the droplet prevention screw is provided throughout an area between the coupled portion of the parallel screw and ship's bottom-shaped screw or taper screw and the tip end ridge portion, it is possible to prevent the problem wherein the droplet prevention screw wears out prior to the parallel screw, which can occur when the droplet prevention screw is positioned closer to the tip end ridge portion. Furthermore, it is possible to prevent the gap between the rotary shaft and the droplet prevention screw becoming greater and the damming effect of the sealing target fluid becoming lesser, which can occur when positioned on the ship's bottom-shaped screw side.

As a result, leakage of the sealing target fluid can be more effectively prevented.

It is preferable that a height h1 from a lower end to an upper end of the droplet prevention screw and a height h2 from a lower end to an upper end of the parallel screw be set to h1<h2. According to this configuration, the height h1 of the droplet prevention screw is set to h1<h2 with respect to the height h2 of a parallel screw 30; therefore, there are occasions where contact force to the rotary shaft is weaker than the parallel screw, and the droplet prevention screw will not inhibit pumping action of the parallel screw.

Effect of the Disclosure

According to the present disclosure, it is possible to provide a sealing device which has higher sealing performance by suppressing occurrence of droplet leakage.

DRAWINGS

FIG. 5 is a view along line V-V of FIG. 2.

FIG. 6 is a schematic drawing illustrating a modified example of one embodiment of the present disclosure.

FIG. 7a illustrates the cross-sectional shape of the droplet prevention screw illustrating when it is an equilateral triangle.

FIG. 7b illustrates the cross-sectional shape of the droplet prevention screw when the interior angle on the base side of the triangle is different.

DETAILED DESCRIPTION

Below, one embodiment of the present disclosure will be described with reference to drawings. In addition, the present disclosure is not limited to the following embodiment, and can be implemented with appropriate variations within a scope wherein the effect of the present disclosure is not inhibited.

Sealing Device 1

Figure 1:
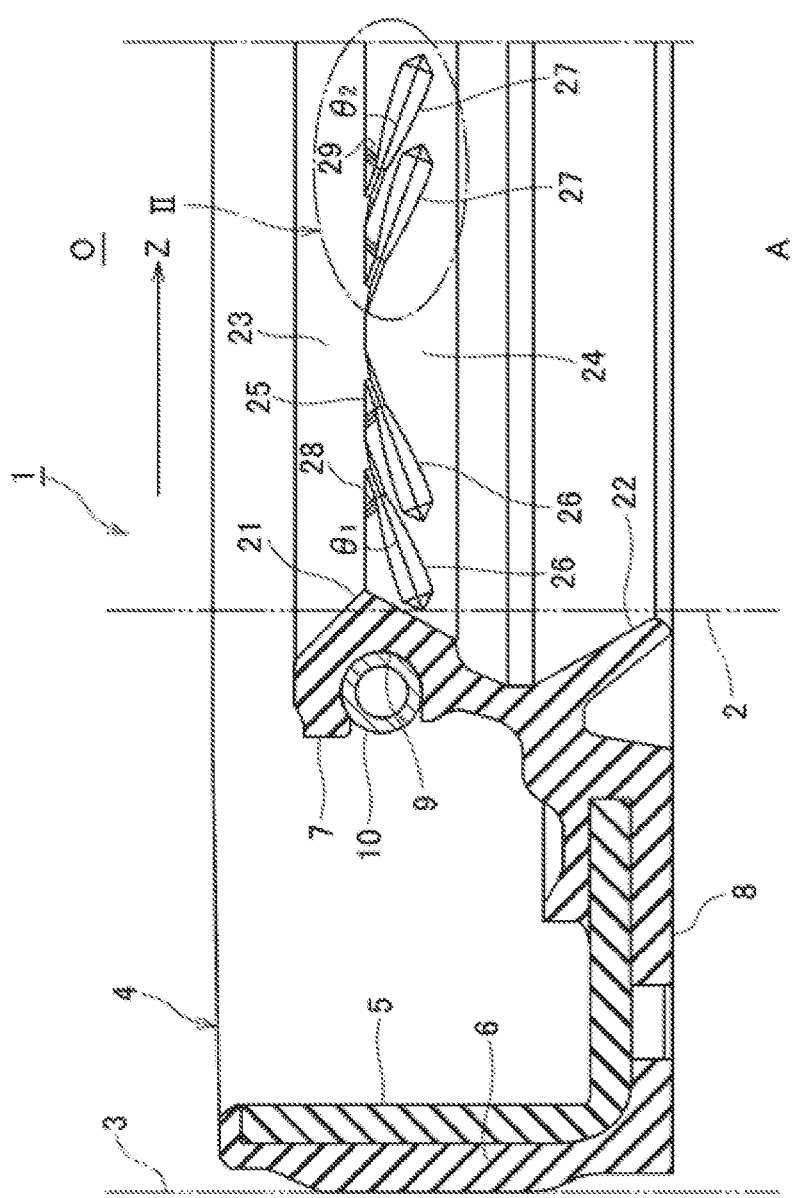
FIG. 1 is a drawing illustrating one embodiment of the sealing device according to the present disclosure, and a schematic drawing viewing essential portions in a cross-section view.

The embodiment described here, for example, is a sealing device that can be used on both sides of a differential gear in an automobile. As illustrated in FIG. 1, the sealing device 1 seals between a rotary shaft 2 and the inner surface of an axial hole 3 of the housing wherein this rotary shaft 2 is inserted and disposed, and prevents or decreases fluid leaking from a sealing target fluid side O to an atmospheric side A. The sealing device 1 is an annular device disposed on the outside of the rotary shaft 2, and FIG. 1 illustrates only these essential parts.

The sealing device 1 has an annular seal body 4 formed with an elastic material, for example, elastomer, and a reinforcing ring 5 with a rigid body, for example, made of metal, for reinforcing the seal body 4, integrally formed on the seal body 4.

The seal body 4 has an outer annular portion 6 which is an outer seal portion fitted on the axial hole 3 of the housing, an inner annular portion 7 disposed coaxially with the outer annular portion 6 on the radially inward side of the outer annular portion 6, and a flange 8 for connecting the outer annular portion 6 and the inner annular portion 7.

The cross-section of the reinforcing ring 5 is an L-shaped ring; the long boundary of the L-shape is integrated with the outer annular portion 6, and the short boundary is integrated with the flange 8.

The outer annular portion 6 is, for example, fixed to the housing by being tightly fitted to the inner surface of the axial hole 3. A groove 9 is formed on the external circumference portion of the inner annular portion 7, and a garter spring 10 for compressing the inner annular portion 7 on the radially inward side is wound within this groove 9.

The seal body 4 further has a seal lip 21 and a dust lip 22. Both the seal lip 21 and dust lip 22 are projections continuous in a circumferential direction, protruding from the inner annular portion 7 to the inside. If the sealing device 1 is disposed on the circumference of the rotary shaft 2, the seal lip 21 and dust lip 22 seal and contact with the outer circumference surface of the rotary shaft 2, preventing or decreasing fluid leaking from the sealing target fluid side O to the atmospheric side A. The seal lip 21 and dust lip 22 slide relatively with respect to the rotary shaft 2 when the rotary shaft 2 rotates.

The dust lip 22 extends diagonally from the atmospheric side A to the inside, from the flange 8 and the coupled portion of the inner annular portion 7. This dust lip 22 is mainly responsible for preventing the intrusion of foreign matter from the atmospheric side A to the sealing target fluid side O.

The seal lip 21 is a projection protruding in a V-shape with two inclined surfaces on the inside of the inner annular portion 7, and the portion that intersects an inclined surface 23 of the sealing target fluid side O and an inclined surface 24 of the atmospheric side A forms a tip end ridge portion 25. Of the two inclined surfaces 23 and 24, the inclined surface 24 of the atmospheric side A is provided with a forward direction screw 26 and a reverse direction screw 27.

(Forward Direction Screw 26, Reverse Direction Screw 27)

The forward direction screw 26, as illustrated in FIG. 1, extends in a direction of forming a positive angle of attack with respect to a direction of forward rotation Z of the rotary shaft 2 on the inclined surface 24 of the atmospheric side A of the seal lip 21. In the embodiment, the "angle of attack" is the angle 81, formed by the direction of the tip end ridge portion 25 of the seal lip 21 and the center line of the forward direction screw 26. The forward direction screw 26 exerts pumping action with respect to the sealing target fluid during the forward rotation of the rotary shaft 2, and pushes back and seals sealing target fluid leaked from the sealing target fluid side O.

The reverse direction screw 27 extends in a direction of forming a positive angle of attack with respect to a direction of rotation opposite to the direction of forward rotation Z of the rotary shaft 2. The "angle of attack" is the angle 82, formed by the direction of the tip end ridge portion 25 of the seal lip 21 and the center line of the reverse direction screw 27. The reverse direction screw 27 exerts pumping action with respect to the sealing target fluid during the reverse rotation of the rotary shaft 2, and pushes back and seals sealing target fluid leaked from the sealing target fluid side O.

The forward direction screw 26 is a ridge provided on the virtual spiral locus formed in an opposite direction to the forward rotation Z of the rotary shaft 2 as origin of the tip end ridge portion 25. Similarly, the reverse direction screw 27 is a ridge provided on the virtual spiral locus formed on the forward rotation Z of the rotary shaft 2 as origin of the tip end ridge portion 25. In this embodiment, the forward direction screw 26 and the reverse direction screw 27 are provided side by side on the circumferential direction of the inclined surface 24.

Details of the reverse direction screw 27 are illustrated in FIG. 2 to FIG. 5. As illustrated in these drawings, the reverse direction screw 27 is a screw formed connecting a so-called parallel screw 30 and a ship's bottom-shaped screw 31. In other words, this reverse direction screw 27 is a screw provided with the parallel screw 30 which extends in a direction of being separated from the tip end ridge portion 25 as origin of the tip edge ridge portion 25 of the seal lip 21, and the ship's bottom-shaped screw 31 which extends in a direction of being further separated from the tip end ridge portion 25 through the coupled portion 32 of a tip end of the parallel screw 30 in an extending direction.

Figure 3:
FIG. 3 is an enlarged cross-section view along line III-III of FIG. 2.
Figure 4:
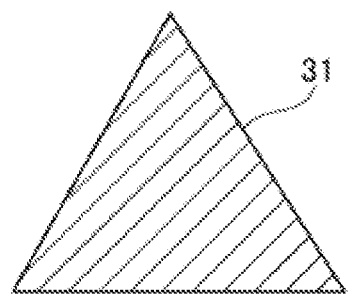
FIG. 4 is an enlarged cross-section view along line IV-IV of FIG. 2.

The parallel screw 30 is a screw formed to be a cross-sectional shape orthogonal to the direction of extension thereof, equal across the total length in the longitudinal direction. In this embodiment, the parallel screw 30, as illustrated in FIG. 3, is a screw formed in a substantially triangular cross-sectional shape orthogonal to the longitudinal direction.

Figure 2:
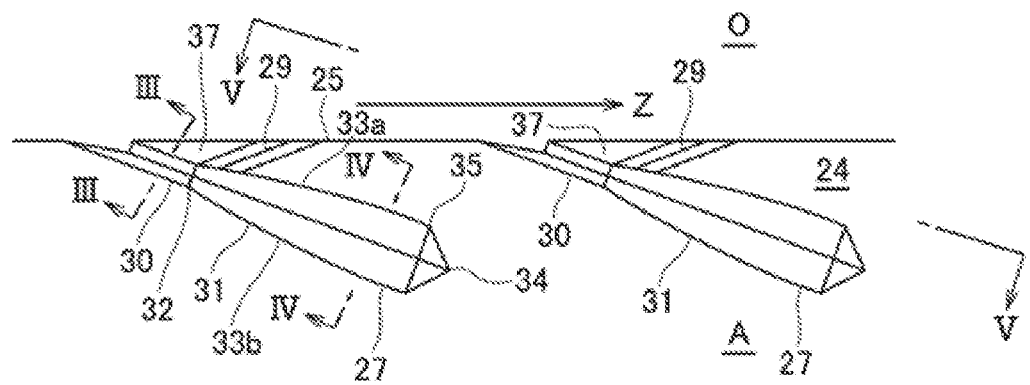
FIG. 2 is an enlarged drawing of an essential portion II of FIG. 1.

The ship's bottom-shaped screw 31 is a screw formed to extend to the atmospheric side A as origin of the coupled portion 32. This ship's bottom-shaped screw 31, as illustrated in FIG. 2 and FIG. 5, is a screw with a lesser width and height at both ends in the longitudinal direction, and a greater width and height at the middle part in the longitudinal direction; when an outline 33$a$, 33$b$ in the width direction illustrated in FIG. 2 is viewed from the side facing the inclined surface 24 of the atmospheric side A, this outline 33$a$, 33$b$ gradually becomes greater toward the atmospheric side A as origin of the coupled portion 32, and passes the maximum width 35 portion near an end edge 34; afterwards, it gradually becomes lesser and reaches the end edge 34. Furthermore, as illustrated in FIG. 5, after an end ridge portion 36 at the upper end thereof reaches a maximum height at the maximum width 35 portion toward the atmospheric side A as the origin of the coupled portion 32, it gradually becomes lesser and reaches the end edge 34.

The reverse direction screw 27 is operated to leak sealing target fluid such as grease, contrary to pumping action when the rotary shaft 2 rotates forward in the direction of forward rotation Z of FIG. 1. There are occasions where the leaked sealing target fluid is between the tip end ridge portion 25 and the reverse direction screw 27, and gradually accumulates near the tip end ridge portion 25 on the side where the reverse direction screw 27 forms the angle of attack, then is leaked in droplets as the rotary shaft 2 rotates in the event where a certain amount is exceeded. It is conceivable that such droplet leakage is due to the strong pumping action of the parallel screw 30, and that the leakage amount lessens as the parallel screw 30 wears down; however, it is necessary to prevent this since there is a risk of droplet leakage.

(Droplet Prevention Screw 28, 29)

The sealing device 1, as illustrated in FIG. 1, is provided with a droplet prevention screw 28, 29 on both sides of the forward direction screw 26 side and the reverse direction screw 27 side of the inclined surface 24 of the atmospheric side A of the seal lip 21. Details of the droplet prevention screw 29 provided on the reverse direction screw 27 side are illustrated in FIG. 2 and FIG. 5. As illustrated in these drawings, the droplet prevention screw 29 is provided to extend in a direction of forming an angle of attack with respect to the direction of forward rotation Z of the rotary shaft 2.

This droplet prevention screw 29 is a screw formed so that it becomes a cross-sectional shape orthogonal to the direction of extension thereof, equal across the total length in the longitudinal direction, the same as the parallel screw 30. In this embodiment, the droplet prevention screw 29 is a screw extending in one direction with an approximately triangular cross-section, the same as the parallel screw 30, and is provided between the coupled portion 32 of the parallel screw 30 and the ship's bottom-shaped screw 31, and the tip end ridge portion 25. In this case, the direction in which the droplet prevention screw 29 is provided is the direction of forming a positive angle of attack with respect to the direction of forward rotation Z of the rotary shaft 2.

Furthermore, the height h1 from the inclined surface 24 of the droplet prevention screw 29 is set to h1<h2 with respect to the height h2 of the parallel screw 30.

In FIG. 1, the droplet prevention screw 28 provided on the direction of forward rotation 26 side is formed in a direction of forming a positive angle of attack with respect to the reverse direction of rotation of the rotary shaft 2, and the direction in which it extends is opposite to the droplet prevention screw 29 provided on the reverse direction screw 27 side described above; the other configuration itself is the same as the droplet prevention screw 29, therefore a description thereof will be omitted.

(Action)

Next, the action of the sealing device 1 configured as in the foregoing will be described. When this sealing device 1, for example, is used as the sealing device 1 on both sides of a differential gear, one of the sealing device 1 is configured so that if the sealing target fluid exceeds the tip end ridge portion 25 and is about to leak to the atmospheric side A, the sealing target fluid is pushed back on the forward direction screw 26 side by the pumping action of the forward direction screw 26 when the rotary shaft 2 rotates. Accordingly, it is possible to suppress a leak of the sealing target fluid to the atmospheric side A. On the other hand, it is possible for the sealing device 1 used on the opposite side of a differential gear to protect from a leak of the sealing target fluid via the pumping action, by the reverse direction screw 27 functioning like the above-mentioned forward direction screw 26 in FIG. 1.

In this embodiment, the forward direction screw 26 and the reverse direction screw 27 respectively have a configuration wherein the parallel screw 30 and the ship's bottom-shaped screw 31 are coupled; therefore, during initial use of the sealing device 1, when the parallel screw 30 with strong pumping action greatly contributes to ensuring sealability and the parallel screw 30 wears out to some extent by using the device, the ship's bottom-shaped screw 31, having a great width and height, faces the atmospheric side A and assumes the function of ensuring sealability. Accordingly, it is possible to ensure sealability over a long period of time.

On the other hand, the reverse direction screw 27 side is operated in the direction wherein a slight amount of sealing target fluid leaks in opposition to pumping action when the rotary shaft 2 rotates forward. In this case, assuming there is a case where the droplet prevention screw 29 is not provided, there are occasions where the leaked sealing target fluid gradually accumulates on the region 37 near the tip end ridge portion 25 of the reverse direction screw 27 illustrated in FIG. 2 and comes out in droplets when it reaches a certain amount.

In this embodiment, as illustrated in FIGS. 1 and 2, the droplet prevention screw 29 is provided from the reverse direction screw 27 to the tip end ridge portion 25. Accordingly, in the reverse direction screw 27 side, the droplet prevention screw 29 is provided to form the angle of attack on the direction of forward rotation Z for when the sealing target fluid is about to leak out from the tip end ridge portion 25, therefore it is operated so the sealing target fluid that is about to leak out is pushed back, the same as the action of the forward direction screw 26 described above. Furthermore, when one part thereof leaks, the droplet prevention screw 29 becomes a dam and the sealing target fluid is contained, therefore leakage of droplets is prevented.

Furthermore, as illustrated in FIG. 5, the height h1 from the inclined surface 24 of the droplet prevention screw 29 is set to h1<h2 with respect to the height h2 of the parallel screw 30. As a result, there may be occasions where contact force to the rotary shaft 2 is weaker than the parallel screw 30, and the droplet prevention screw 29 will not inhibit pumping action of the parallel screw 30.

Furthermore, in this embodiment, one end thereof is positioned on the coupled portion 32 of the parallel screw 30 and the ship's bottom-shaped screw 31 as the position wherein the droplet prevention screw 29 is provided, therefore, it is possible to more effectively prevent leakage of the sealing target fluid. In other words, there are occasions where a problem occurs wherein the droplet prevention screw 29 wears out prior to the parallel screw 30 when one end of the droplet prevention screw 29 is positioned closer to the tip end ridge portion 25 of the seal lip 21, and furthermore, the gap between the rotary shaft 2 and the droplet prevention screw 29 becomes greater and the damming effect of the sealing target fluid becomes lesser when positioned on the ship's bottom-shaped screw 31 side. Accordingly, it is preferable that once the position of the droplet prevention screw 29 becomes a suitable angle of attack with respect to the direction of forward rotation Z of the rotary shaft 2, one end thereof is positioned on the coupled portion 32 of the parallel screw 30 and the ship's bottom-shaped screw 31.

The droplet prevention screw 28 of the forward direction screw 26 side is provided from the forward direction screw 26 to the tip end ridge portion 25, and the other configuration is the same as the droplet prevention screw 29 of the reverse direction screw 27 side described above, and the action thereof is also the same as the droplet prevention screw 29 when the rotary shaft 2 rotates in the opposite direction to the direction of forward rotation Z, therefore a description thereof will be omitted.

In this sealing device 1, the droplet prevention screws 28 and 29 are provided on the forward direction screw 26 side and the reverse direction screw 27 side, therefore when these, for example, are provided as common parts on both sides of a differential gear, it is possible to prevent leakage of the sealing target fluid that is about to leak in droplets from the side functioning as a reverse direction screw.

In the embodiment illustrated in FIG. 1 to FIG. 5, the droplet prevention screws 28 and 29 are provided on both sides of the forward direction screw 26 side and the reverse direction screw 27 side as a sealing device that can be used on both sides of a differential gear, however, the droplet prevention screws 28 and 29 may have a configuration provided on any side of the reverse direction screw 26 side and the reverse direction screw 27 side according to the usage state of the apparatus using this sealing device.

FIG. 6 is a drawing illustrating a modified example of the foregoing embodiment. Although only the reverse direction screw 27 is illustrated in FIG. 6, the forward direction screw is also provided in the same configuration as the reverse direction screw 27. This modified example is different from the configuration of FIG. 1 to FIG. 5 in that a taper screw 38 is formed continuously from the coupled portion 32 of the parallel screw 30 to the atmospheric side A. The configuration of the taper screw 38 is lacking a portion beyond a maximum diameter portion 35, of the ship's bottom-shaped screw 31 described in FIG. 2. Even in this modified example illustrated in FIG. 6, the parallel screw 30 and the taper screw 38 have an operational effect the same as the configuration of the foregoing parallel screw 30 and the ship's bottom-shaped screw 31 illustrated in FIG. 1 to FIG. 5.

FIG. 7 is a drawing illustrating the cross-sectional shape of the droplet prevention screw 29, and FIG. 7 (a) is the cross-sectional shape of the droplet prevention screw 29 of the foregoing embodiment illustrated in FIG. 1 to FIG. 5, and there are occasions where the cross-sectional shape forms a triangle shape, and the interior angles are each the same 81. The cross-sectional shape of this droplet prevention screw 29, as illustrated in FIG. 7 (b), may be such that the interior angles on the bottom side of the triangular cross section are made to be different, such as 82 on one side and 83 on the other side. Also, if the inclined surface side of the 82 side with a greater angle is positioned to face the tip end ridge portion 25 illustrated in FIG. 2, it is possible to further enhance the effect of pushing back the sealing target fluid leaked from the tip end ridge portion 25 and the effect of damming droplets.

Figure 8:
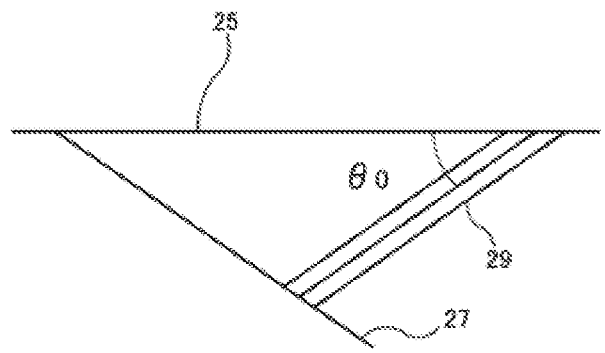
FIG. 8 is a drawing illustrating the angle of attack of the droplet prevention screw.

FIG. 8 is a drawing illustrating the direction of forming the droplet prevention screw 29. This drawing is a drawing corresponding to the configuration of FIG. 2, and the droplet prevention screw 29 is provided between the reverse direction screw 27 and the tip end ridge portion 25. Here, the angle of attack 80 of between the droplet prevention screw 29 and the tip end ridge portion 25 may be appropriately set according to the number of rotations of the rotary shaft 2, and so on.

Figure 9A:
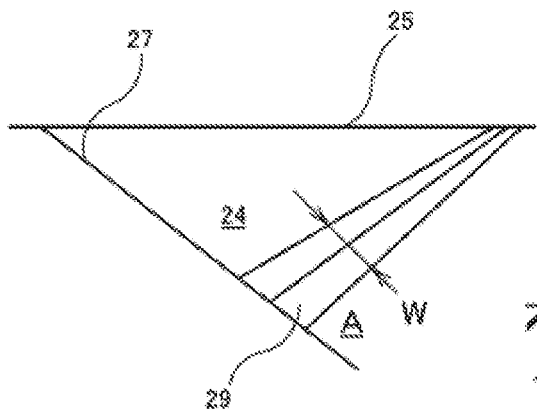
FIG. 9a illustrates another form of the droplet prevention screw viewed from the side on the inclined surface.
Figure 9B:
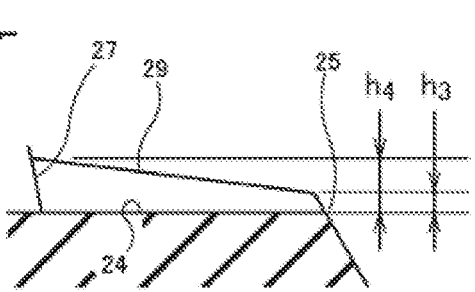
FIG. 9b illustrates a lateral view of the droplet prevention screw.

FIG. 9 is a drawing illustrating a modified example of the droplet prevention screw 29. FIG. 9 (a) is a drawing of the droplet prevention screw 29 viewed from the side on the inclined surface 24, and FIG. 9 (b) is a drawing laterally viewing the droplet prevention screw 29. The droplet prevention screw 29 illustrated in this drawing is formed so that the height gradually increases from h3 to h4, on the tip end ridge portion 25 to the reverse direction screw 27, and even the width w thereof is formed to gradually become greater. The cross-sectional area of the atmospheric side A gradually becomes greater according to this droplet prevention screw 29, therefore, there is an advantage where it is harder to wear out, even with long periods of use.

Furthermore, in the embodiment illustrated in FIG. 1 to FIG. 5, the droplet prevention screw 29 is only provided on the forward direction screw 26 side and the reverse direction screw 27 side respectively, and this droplet prevention screw 29 may be provided in plurality, and positioned mutually parallel.

DESCRIPTION OF REFERENCE NUMERALS

1 Sealing device
2 Rotary shaft
3 Axial hole
4 Seal body
5 Reinforcing ring
6 Outer annular portion
7 Inner annual portion
8 Flange
9 Groove
10 Garter spring
21 Seal lip
22 Dust lip
23 Inclined surface of sealing target fluid side O
24 Inclined surface of atmospheric side A
25 Tip end ridge portion
26 Forward direction screw
27 Reverse direction screw
28, 29 Droplet prevention screw
30 Parallel screw
31 Ship's bottom-shaped screw
32 Coupled portion
33a, 33b Outline
34 End edge
35 Maximum width portion
36 End ridge portion
37 Region forming the angle of attack
38 Taper screw
A Atmospheric side
O Sealing target fluid side
Z Direction of forward rotation

The invention claimed is:

1. A sealing device provided with, on an atmospheric side inclined surface of a seal lip, a forward direction screw which extends in a direction of forming an angle of attack with respect to a direction of forward rotation of a rotation shaft and exerts pumping action with respect to sealing target fluid during the forward rotation of the rotation shaft, and a reverse direction screw which extends in a direction of forming an angle of attack with respect to a direction of reverse rotation of the rotation shaft and exerts pumping action with respect to the sealing target fluid during the reverse rotation of the rotation shaft, wherein a droplet prevention screw for the sealing target fluid is provided on the reverse direction screw side of the atmospheric side inclined surface and extending directly from the forward direction screw and to a ridge portion of the seal lip so as to be positioned in a region for forming the angle of attack.

2. The sealing device as claimed in claim 1, wherein the droplet prevention screw is also provided on the forward direction screw side.

3. The sealing device as claimed in claim 1, wherein the droplet prevention screw is provided to extend in a direction of forming an angle of attack with respect to a direction of rotation of the rotation shaft.

4. The sealing device as claimed in claim 1, wherein the forward direction screw and the reverse direction screw respectively include a parallel screw which extends in a direction of being separated from a tip end ridge portion of the seal lip with the tip end ridge portion as origin, and a ship's bottom-shaped screw or a taper screw which extends in a direction of being further separated therefrom through a connection portion of a tip end of the parallel screw in an extending direction.

5. The sealing device as claimed in claim 4, wherein the droplet prevention screw is provided throughout an area between the connection portion and the tip end ridge portion.

6. The sealing device as claimed in claim 4, wherein a height $h1$ from a lower end to an upper end of the droplet prevention screw and a height $h2$ from a lower end to an upper end of the parallel screw are set to be $h1<h2$.

* * * * *